United States Patent
Doane et al.

(10) Patent No.: US 10,443,343 B2
(45) Date of Patent: Oct. 15, 2019

(54) THREADED PACKING ELEMENT SPACER RING

(71) Applicant: Baker Hughes, a GE company, LLC, Houston, TX (US)

(72) Inventors: James C. Doane, Friendswood, TX (US); Gary L. Anderson, Humble, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 102 days.

(21) Appl. No.: 15/674,057

(22) Filed: Aug. 10, 2017

(65) Prior Publication Data

US 2019/0048682 A1  Feb. 14, 2019

(51) Int. Cl.
*E21B 33/128* (2006.01)
*F16J 15/3268* (2016.01)
*F16J 15/06* (2006.01)

(52) U.S. Cl.
CPC .......... *E21B 33/128* (2013.01); *F16J 15/3268* (2013.01); *F16J 15/06* (2013.01)

(58) Field of Classification Search
CPC .............................. E21B 33/1216; E21B 33/128
See application file for complete search history.

(56) References Cited

U.S. PATENT DOCUMENTS

| | | | | |
|---|---|---|---|---|
| 3,109,493 A | * | 11/1963 | Carter | E21B 33/12 277/337 |
| 3,354,697 A | * | 11/1967 | Wilkerson | E21B 47/1025 137/516.27 |
| 3,392,785 A | * | 7/1968 | King | E21B 33/128 166/187 |
| 3,438,438 A | * | 4/1969 | Conrad | E21B 33/1265 166/121 |
| 4,077,472 A | * | 3/1978 | Gano | E21B 23/06 166/125 |
| 4,176,715 A | * | 12/1979 | Bigelow | E21B 33/1291 166/138 |
| 4,326,588 A | * | 4/1982 | McStravick | E21B 33/1208 166/124 |
| 4,438,933 A | | 3/1984 | Zimmerman | |
| 4,457,369 A | * | 7/1984 | Henderson | E21B 33/1293 166/125 |
| 4,468,952 A | * | 9/1984 | Rathburn | G01M 3/2853 73/40.5 R |
| 4,601,498 A | * | 7/1986 | Haugen | E21B 17/042 277/338 |

(Continued)

Primary Examiner — Shane Bomar
(74) Attorney, Agent, or Firm — Shawn Hunter

(57) ABSTRACT

An extrusion ring is attached at a mandrel end to a gage ring as well as a softer ring that is disposed between the extrusion ring and the mandrel. The softer ring acts as an extrusion barrier along the mandrel. On setting the softer ring protects a free end of an extrusion ring from contact with the sealing element by extending axially at least as far as the extrusion ring and preferably further. The sealing element being softer than the adjacent softer ring allows the extrusion ring to push the softer ring out past the end of the extrusion ring and allows the softer ring to fill a void space adjacent the free end of the extrusion ring and to the sealing element. Relative motion between the rings at the attachment location is prevented.

12 Claims, 3 Drawing Sheets

(56) References Cited

U.S. PATENT DOCUMENTS

| | | | | |
|---|---|---|---|---|
| 4,611,658 | A | * | 9/1986 | Salerni ................ E21B 33/1216 166/120 |
| 4,753,444 | A | | 6/1988 | Jackson et al. |
| 5,086,839 | A | * | 2/1992 | Setterberg, Jr. ..... E21B 33/1292 165/DIG. 442 |
| 5,542,473 | A | * | 8/1996 | Pringle .................. E21B 23/01 166/120 |
| 6,167,963 | B1 | * | 1/2001 | McMahan ........... E21B 33/1204 166/118 |
| 7,373,973 | B2 | * | 5/2008 | Smith ................ E21B 33/1216 166/134 |
| 9,784,066 | B1 | * | 10/2017 | Branton .............. E21B 33/1216 |
| 2006/0189208 | A1 | * | 8/2006 | Shaikh ............... H01R 13/5202 439/589 |
| 2006/0243457 | A1 | | 11/2006 | Kossa et al. |
| 2013/0306330 | A1 | * | 11/2013 | Bishop ................ E21B 33/1216 166/387 |
| 2014/0290946 | A1 | | 10/2014 | Nguyen et al. |
| 2016/0084036 | A1 | | 3/2016 | Themig |
| 2016/0290093 | A1 | * | 10/2016 | Doane ................... E21B 33/128 |

* cited by examiner

THREADED PACKING ELEMENT SPACER RING

FIELD OF THE INVENTION

The field of the invention is compression set retrievable packers and more particularly those with a combination backup ring and softer ring than the backup ring between the backup ring and the sealing element.

BACKGROUND OF THE INVENTION

Packers are used as barriers in boreholes to direct pressure into a formation for a treatment. Some designs are made to be retrieved. Provisions are made at opposed ends of sealing elements to prevent extrusion. The extrusion barriers that have been tried have lacked several features addressed by the present design. One design criteria is that the ends of the sealing element need protection from swabbing when fast moving fluids are pumped past a sealing element before a packer is set. This can happen when there is a need to replace one well fluid with another before the packer is set and the pumping rates create high velocities. These high flow rates can distort the extrusion ring assembly to a point where after the set the extrusion barrier fails to accomplish its intended function.

Some designs use overlapping extrusion rings. In this design the ends of the extrusion rings radially overlap the sealing element ends for running in. The problem here can be that during the setting of the sealing element some of the rubber climbs over the end of the extrusion ring assembly such that the sealing element radially overlays the extrusion ring assembly. When this happens there is no effective extrusion barrier as the extrusion ring assembly is prevented from engaging the surrounding tubular. The end of the extrusion ring assembly could also penetrate into the sealing element and prevent the sealing element from sealing. This could also make removal of the packer more difficult as the extrusion ring assembly that is embedded into the sealing element prevents adequate retraction of the sealing element for retraction. Other potential issues of known designs include extrusion along the mandrel.

Some specific known designs will be discussed below to illustrate the shortcomings of the past designs. In FIG. 1 a sealing element 10 is flanked on opposed ends with a Teflon® spacer 12 and then a wire mesh ring 14. The unset position is shown. The issue with this design is that if there is a high velocity circulation rate past the unset sealing element 10 the wire mesh is too soft to resist those high velocities and can be pushed into the extrusion gap causing damage to the wire mesh preventing it from performing properly. The design intent is to make the wire mesh ring 14 soft enough to move with the sealing element 10 out to the surrounding tubular that is not shown. If the wire mesh is made stiff then the sealing element 10 can climb over the mesh ring 14 during the set in which case the ring 14 will not prevent extrusion. The ring 14 and the spacer 12 are simply abutting and can move relatively to one another during the set.

FIGS. 2 and 3 illustrate another known design where the extrusion rings 18 and 20 flank a sealing element 22. Ideally, during setting, the rings 18 and 20 move ahead of the sealing element. However, the sealing element 22 can move out faster than the rings 18 and 20 in which case the sealing element 22 can wrap around the rings 18 and 20 to defeat the purpose of the rings 18 and 20 so that there is effectively no extrusion barrier. In such cases the free ends of the rings 18 an 20 can embed into the sealing element 22 making removal extremely complicated as the rings 18 and 20 hold the sealing element out against the surrounding tubular rather than allowing the sealing element to retract away from the surrounding tubular so that the packer can be pulled out rather than getting stuck and having to be milled out.

The present invention protects the sealing element from the end of an extrusion ring with an intermediate softer layer attached to the extrusion ring such that during the set the intermediate layer sticks out axially further to protect the sealing element from the free end of the extrusion ring. The extrusion ring and the intermediate layer are affixed to each other which keeps the parts concentric to each other and restricts relative motion between the parts. The intermediate layer acts as an extrusion barrier against the mandrel. The end of the intermediate layer can fill a void space between an end of the extrusion ring and the sealing element. These and other aspects of the present invention will be more readily apparent to those skilled in the art from a review of the description of the preferred embodiment and the associated drawings while recognizing that the full scope of the invention is to be determined from the appended claims.

SUMMARY OF THE INVENTION

An extrusion ring is attached at a mandrel end to a gage ring as well as a softer ring that is disposed between the extrusion ring and the mandrel. The softer ring acts as an extrusion barrier along the mandrel. On setting the softer ring protects a free end of an extrusion ring from contact with the sealing element by extending axially at least as far as the extrusion ring and preferably further. The sealing element is softer than the adjacent softer ring. The softer ring is pushed out past the end of the extrusion ring and allows the softer ring to fill a void space adjacent the free end of the extrusion ring and to the sealing element. Relative motion between the rings at the attachment location is prevented. The attachment also keeps the parts concentric.

DETAILED DESCRIPTION OF THE PREFERRED EMBODIMENT

Figure 1:
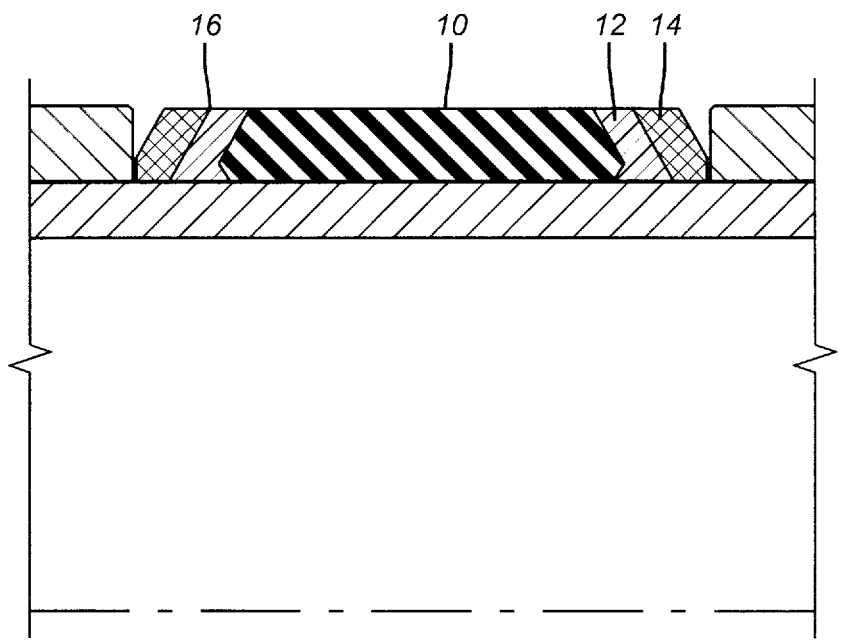
FIG. 1 is a prior art design using a wire mesh extrusion barrier with a spacer to cover the openings in the mesh.
Figure 2:
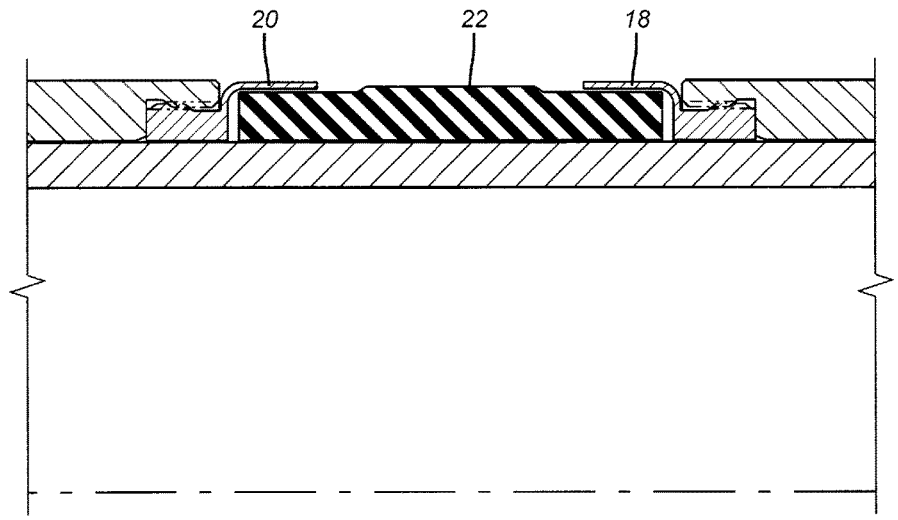
FIG. 2 is another prior art design in the run in position with the extrusion ring extending over the sealing element.
Figure 3:
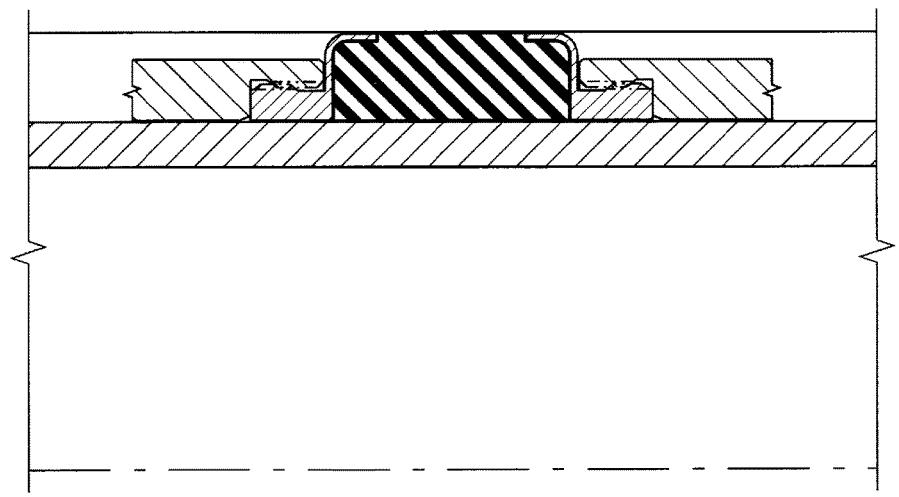
FIG. 3 is the view of FIG. 2 is the set position.
Figure 4:
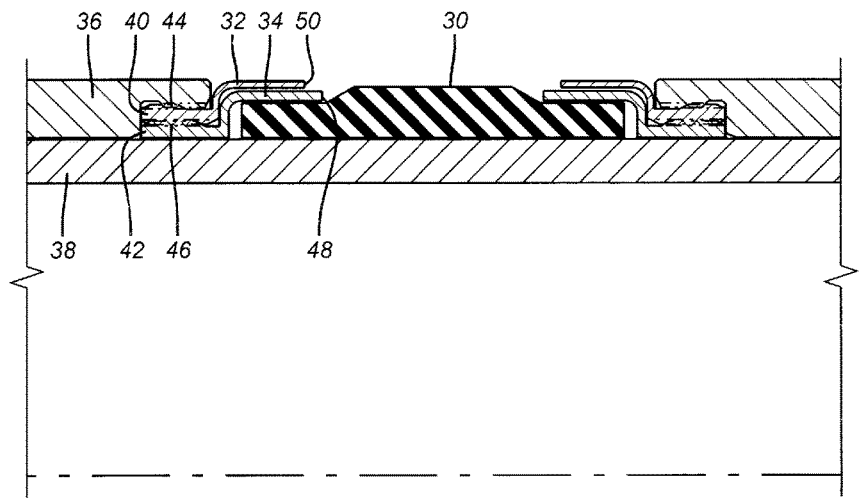
FIG. 4 is a run in view of the device of the present invention.
Figure 5:
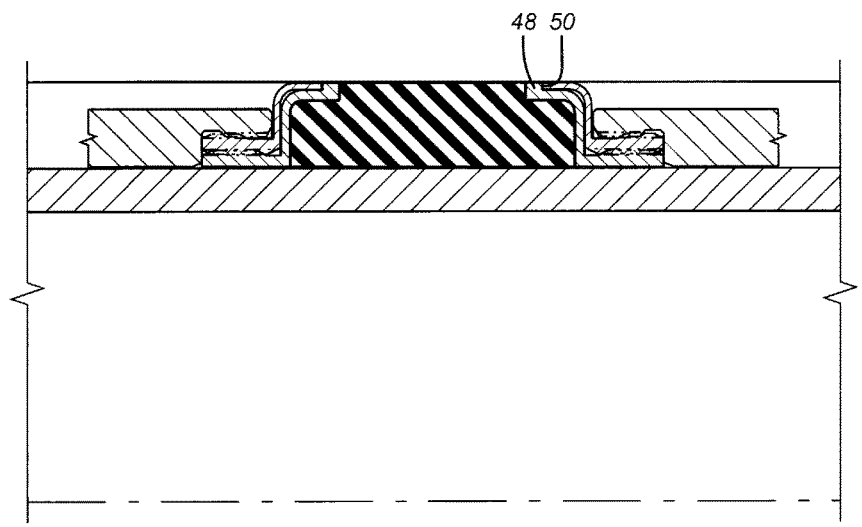
FIG. 5 is a set view of the device in FIG. 4.

FIG. 4 shows a run in position of a sealing element 30 that has an assembly preferably at each end of an inner ring 34 and an outer extrusion ring 32. A gage ring 36 is mounted over rings 32 and 34 and mandrel 38. Ends 40 and 42 are fixed against relative movement. Thread 44 attaches ring 32 to gage ring 36. Thread 46 attaches ring 34 to ring 32. Alternative fixation techniques are envisioned for ends 40 and 42 such as pins or dowels radially inserted into both, a bayonet connection, keys or adhesives to name a few options. Ring 34 is softer than ring 32 and preferably extends further at free end 48 than end 50 of extrusion barrier ring 32. Since ring 34 is softer than ring 32 but harder than the sealing element 30 it will move axially to bring end 48 out further than end 50 during setting. Thus, ring 34 may have its end 48 extend axially the same distance as end 50 or less before the setting begins and during the setting end 48 will be squeezed to move relatively to end 50. End 48 can move radially in front of end 50 as shown in FIG. 5 as a result of setting because the material of ring 34 is softer than ring 50 and harder than sealing element 30. Any gap between sealing element 30 and end 50 will fill with compressed ring 34. Ring 34 can be Teflon® or PEEK or another material that tolerates the borehole environment while meeting the softness criteria of being harder than sealing element 30 and softer extrusion ring 32.

The inside diameter extrusion barrier is created by the ID of the Ring 34 being a tight fit with the OD of the Mandrel 38.

By securing ends 40 and 42 to each other their concentric position with respect to each other is maintained and relative axial motion at those ends is prevented.

The above description is illustrative of the preferred embodiment and many modifications may be made by those skilled in the art without departing from the invention whose scope is to be determined from the literal and equivalent scope of the claims below:

We claim:

1. A packer for borehole use comprising:
a sealing element mounted to a mandrel, said sealing element selectively axially compressed from a run in position to a set position against a borehole wall;
an extrusion ring assembly mounted to said mandrel on at least one end of said sealing element comprising an outer extrusion barrier ring retained on one end to an intermediate ring, said intermediate ring being softer than said outer extrusion barrier ring;
the intermediate ring and the outer extrusion barrier ring extend radially outside of the sealing element such that free ends of each ring are located radially between the sealing element and the surrounding tubular while the sealing element is in the run in position;
the free end of the intermediate ring extends axially beyond the free end of the outer extrusion barrier ring in said run in position or in said set position; and
the free end of the intermediate ring contacts the surrounding tubular in the set position.

2. The packer of claim 1, wherein:
said intermediate ring reduces extrusion of said sealing element along said mandrel.

3. The packer of claim 1, wherein:
said intermediate ring is threaded at one end to said outer extrusion barrier ring.

4. The packer of claim 1, wherein:
said intermediate ring is secured at one end to said outer extrusion barrier ring with a rod, a pin, a bayonet connection, a snap ring or an adhesive.

5. The packer of claim 1, wherein:
said intermediate ring is harder than said sealing element.

6. The packer of claim 1, wherein:
attachment of said intermediate ring to said outer extrusion barrier ring centralizes said intermediate ring to said outer extrusion barrier ring.

7. The packer of claim 1, wherein:
said intermediate ring prevents the free end of said outer extrusion barrier ring from penetrating into said sealing element in said set position.

8. The packer of claim 1, wherein:
said intermediate ring is made from Teflon® or PEEK.

9. The packer of claim 1, wherein:
said free end of said intermediate ring moves relatively to said end of said outer extrusion barrier ring.

10. The packer of claim 9, wherein:
said free end of said intermediate ring moves radially beyond said end of said outer extrusion barrier ring into a position between said sealing element and said end of said outer extrusion barrier ring.

11. The packer of claim 1, wherein:
said rings overlap an end of said sealing element in said run in position.

12. The packer of claim 1, wherein:
said rings are disposed at opposed ends of said sealing element.

* * * * *